United States Patent
Wen (10) Patent No.: US 8,031,768 B2
(45) Date of Patent: Oct. 4, 2011

(54) SYSTEM AND METHOD FOR PERFORMING OPTIMIZED QUANTIZATION VIA QUANTIZATION RE-SCALING

(75) Inventor: Jiangtao Wen, La Jolla, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1364 days.

(21) Appl. No.: 11/013,839

(22) Filed: Dec. 15, 2004

(65) Prior Publication Data

US 2006/0133478 A1   Jun. 22, 2006

(51) Int. Cl.
*H04N 7/12* (2006.01)
(52) U.S. Cl. .............................. 375/240.03; 375/240.02
(58) Field of Classification Search ............. 375/240.03, 375/240.02; 382/56
See application file for complete search history.

(56) References Cited

U.S. PATENT DOCUMENTS

| | | | | |
|---|---|---|---|---|
| 5,086,488 A * | 2/1992 | Kato et al. | ..................... | 382/239 |
| 5,262,854 A * | 11/1993 | Ng | ............................ | 375/240.24 |
| 5,426,463 A * | 6/1995 | Reininger et al. | ........ | 375/240.03 |
| 5,559,557 A * | 9/1996 | Kato | ......................... | 375/240.03 |
| 5,731,837 A * | 3/1998 | Hurst, Jr. | .................. | 375/240.03 |
| 7,194,030 B2 * | 3/2007 | Xiong et al. | ............. | 375/240.02 |
| 2002/0012470 A1 * | 1/2002 | Luna et al. | ..................... | 382/233 |

* cited by examiner

*Primary Examiner* — Tung Vo
*Assistant Examiner* — Anner Holder
(74) *Attorney, Agent, or Firm* — North Weber & Baugh LLP (57) ABSTRACT

A method, system, and program product for quantizing discrete cosine transform coefficients, e.g., for MPEG compression, with minimal bit rate overhead and without using a quantization matrix. This is done by scaling a uniform quantization parameter for the entire discrete cosine transform block, defining a variety of thresholds for the quantization of discrete cosine transform coefficients below which the corresponding coefficient will be quantized to zero, and setting different normative reconstructed values for coefficients that have not been quantized to zero as the decoder will still use the original, unmodified reconstructed values as long as the corresponding coefficient is not zero.

21 Claims, 4 Drawing Sheets

SYSTEM AND METHOD FOR PERFORMING OPTIMIZED QUANTIZATION VIA QUANTIZATION RE-SCALING

BACKGROUND

The invention is directed to optimizing the quantization of transform coefficients with minimal bit rate overhead by scaling a uniform quantization parameter for the entire transform block, obviating the need for a quantization matrix. Although the invention is described in the context of video coding, those skilled in the art will understand that one can apply the invention to other areas, such as image and audio coding.

The basic essence of a video transmission is a sequence of pictures transmitted at a relatively fixed time sequence for reproduction at a receiving site. For digital transmissions, such sequences of pictures are transmitted in the form of a digital bit stream that is stored at the receiving site for reproduction in some form. In practice, such digitized video transmissions have accompanying audio and synchronization data that together add up to a large amount of data. The video and audio data can occupy a vast amount of storage space as well as transmission bandwidth.

In order to save transmission bandwidth and storage space, video data is compressed at the transmission end, and decompressed at the receiving end. Video compression typically involves taking the differences between adjacent pictures in a stream of pictures or frames and then coding most frames as differences relative to neighboring pictures. This may be done in several ways through the process of motion estimation and compensation by the encoder, and motion compensation at the decoder. An encoder at the beginning of the transmission process is required to determine the way in which a picture is compressed, solely at its own discretion, and then calculate the displacement or motion vectors. This is done frequently through code sequences represented by a long decision tree. In contrast, the decoder at the receiving end is configured to merely perform decoding operations according to discrete operational processes performed by the encoder, or "does what it is told to do." To serve as a basis of prediction of other frames and to provide functionalities such as random access to the compressed bitstream, the encoder will occasionally encode input video frames independent of other frames. Such frames are termed "Intra" coded frames. In contrast, other frames that are encoded as the difference between the input and the motion compensated predicted information are termed "Inter" coded frames. An encoder sometimes uses information from "future" or subsequent frames in a sequence of frames to decode current frames. Thus, the coding order, the order in which compressed frames are transmitted, is not the same as the display order, which is the order in which the frames are presented to a viewer. Frames encoded with reference to both future and past frames are termed "B" (B-directional) frames.

Figure 1:
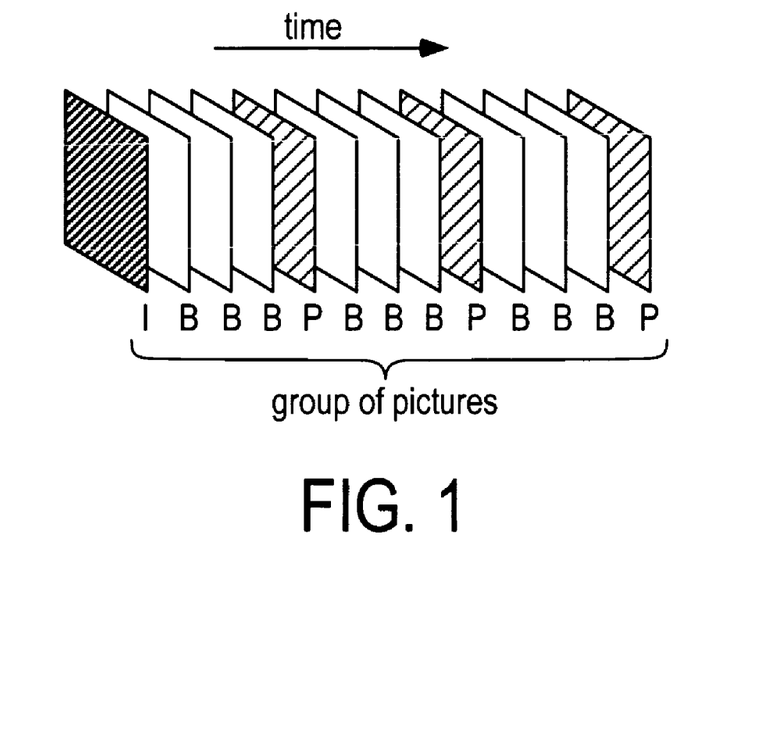
FIG. 1 shows a "Group of Pictures" in display order as presented to a viewer.
Figure 2:
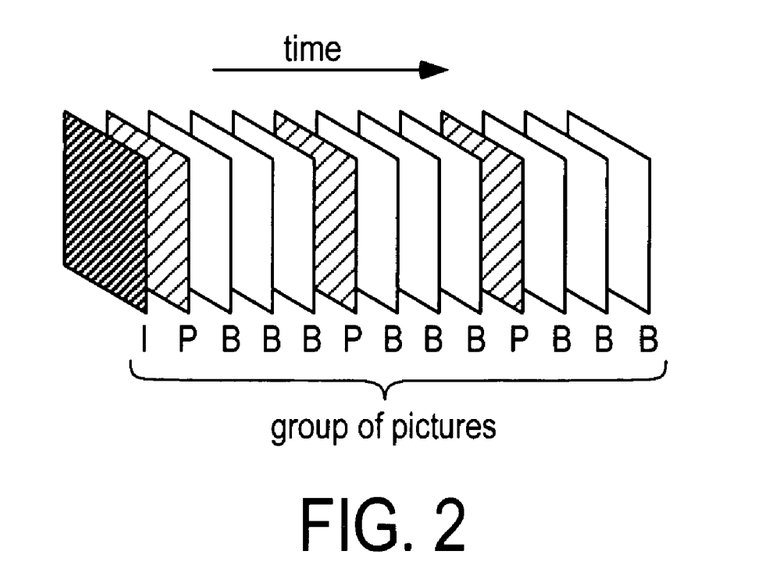
FIG. 2 shows a "Group of Pictures" in transmission order as transmitted to a decoder.
Figure 3:
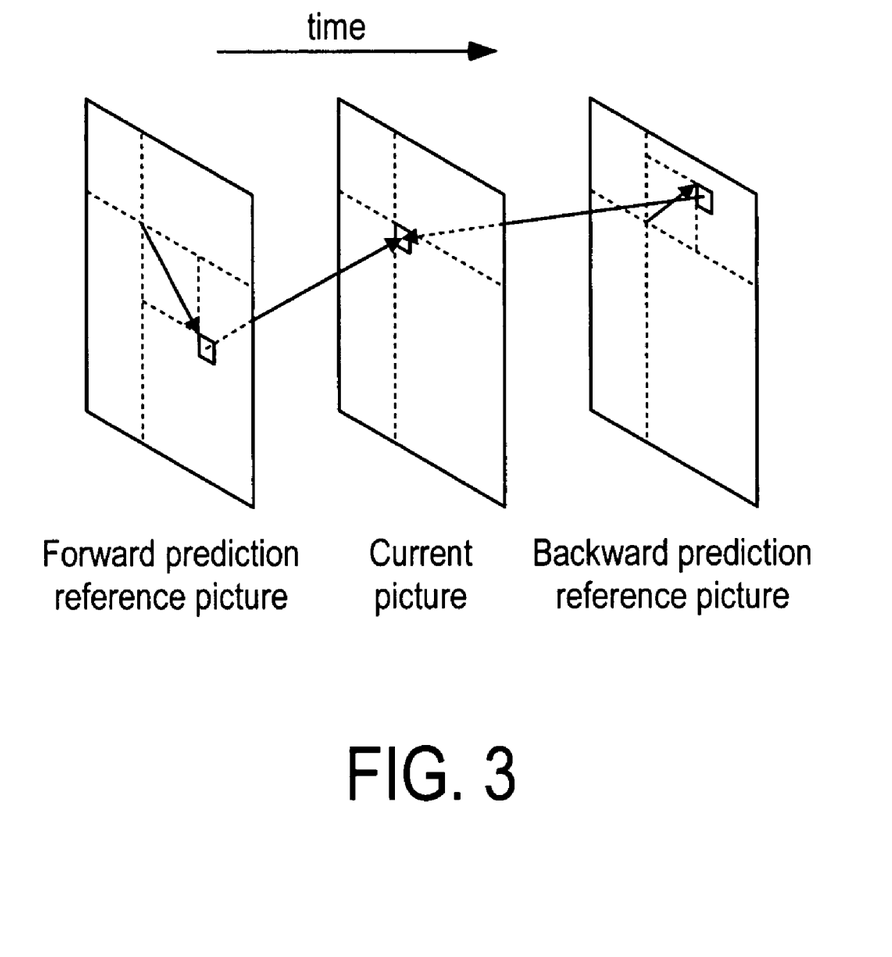
FIG. 3 illustrates how motion vectors are used to construct a frame.

MPEG (Movie Picture Expert Group) is a standard specifically engineered for inter-frame (motion) compression of video sequences. FIGS. 1 and 2 illustrate, respectively, a group of pictures in display order in FIG. 1 and in coding order in FIG. 2. In FIGS. 1 and 2 "I" represents intra coded frames, "B" represents bidirectional coded pictures, and "P" represents predicted pictures. FIG. 3 illustrates the use of a forward prediction reference pictures and backward prediction reference pictures to generate a current picture. Specifically, FIG. 3 illustrates motion compensation, that is, how future pictures are predicted from subsequent pictures (and future pictures). If motion occurs in a sequence of frames, prediction is carried out by coding differences relative to areas that are shifted with respect to the area being coded. This is known as "motion compensation," and the process of determining the motion vectors is called "motion estimation." The resulting motion vectors, describing the direction and amount of motion of a macroblock, are stored and transmitted to the decoder as part of the MPEG bitstream. In operation, the decoder uses the origin and length of the motion vector to reconstruct the frame.

In intra-coding a single frame, the basic building block is the macroblock. Typically, the macroblock is a 16×16 sample array of luminance (gray scale) samples together with one 8×8 block of samples for each of the two chrominance (color) components. Next in the hierarchy is what is known as the "slice," a contiguous sequence of macroblocks in raster scan order. The slice starts at a specific address or position in the picture, and the address is specified in a slice header.

Intercoding and intracoding are both built on the Discrete Cosine Transform (hereinafter the "DCT"), representing the prediction error after motion compensation (in the case of Inter coding) of the input signal itself (in the case of Intra coding) as a linear combination of spatial frequencies. Each spatial frequency pattern has a corresponding DCT coefficient, that is, the amplitude needed to represent the contribution of the specific spatial frequency to the block of data being represented.

DCT coefficients are then quantized by a scalar quantizer via division by a non-zero "quantization step size" and thereafter either truncating the quantized DCT coefficient or rounding the quantized DCT quotient to the nearest integer, termed quantization levels. At the decoder, the inverse operation ("de-quantization") is performed by multiplying the quantization level by the same quantization step size used by the cnoder. Both the quantization step size and the quantization levels for each DCT coefficient are signaled in the compressed bitstreams. The reconstruction values, as determined by the above process will always be a multiple of the quantization step size of the corresponding coefficient used by the encoder.

It is to be noted that, the larger the quantization value, the lower the precision of the quantized DCT coefficient, and the smaller the quantization level. Physiologically, large quantization values for high spatial frequencies allows the encoder to discard high frequency activity that are of lower perceptability to the human eye. This saves bandwidth and storage space by discarding data that can not be detected by the human eye.

To exploit the difference is perceptability of different DCT frequencies by the human visual system and to improve compression performance, in image and video compression standards such as JPEG and MPEG-2, quantization matrices were designed so that different quantization step sizes could be applied to different DCT coefficients by signaling only the matrix itself, instead of each of the 8×8=64 different quantization step sizes, one for each DCT coefficient. Standards such as JPEG further allows the signaling of customized quantization matrices from the encoder to the decoder to take advantage of the differences in statistics of the input image and video signal at hand. For example, a JPEG encoder used for media images may use a different quantization matrix than one used for consumer digital cameras.

It should be noted that, however, not all image and video coding standards use quantization matrices or allow the usage of custom quantization matrices. Also, due to numerous profiles and levels for all image and video coding standards which define the subset of image and video coding tools used by compliant encoder and decoders, not all standard compliant image and video decoders support the usage of custom quantization matrices, even if the matrices are transmitted in the bitstreams in a standard-compliant manner. In addition, when the original image and video signal to be compressed exhibit strong time-varying characteristics, adapting the quantization matrix to the varying input may require a large overhead of extra data associated with sending the quantization matrices. For some standards or configured CODECs (components having combined analog to digital and digital to analog converters), dynamic adjustment of quantization matrices may not even be possible.

Therefore, it is highly desirable to design a system that can benefit from the capability of differentiated quantization for DCT coefficients without the overhead of sending the possibly time varying quantization matrices in the bitstreams. As will be seen, the invention accomplishes this and overcomes the shortcomings of the prior art in an elegant manner.

SUMMARY OF INVENTION

The invention is directed to a system and method of quantizing discrete cosine transform coefficients for image and video compression using a novel rescaling method in the encoding process. The process of encoding a video signal includes first defining a plurality of thresholds for the quantization of each DCT coefficient, below which the corresponding coefficient will be quantized to zero. This could be accomplished via a standard rate control algorithm which determines the quantization step sizes for DCT coefficients based on input signal, target bitrate and video encoding buffer fullness information. Then, based on the input, the application, and the constellation of the coefficients, particularly those that will not be quantized to zero ("non-zero coefficients"), the encoder determines a set of desirable reconstructed values for each of the non-zero coefficients. Then, based on encoding rate, distortion and other possibly application-specific considerations, the encoder produces standard compliant bitstreams that contain information pertaining to a quantization step size. Unlike conventional processes, these step sizes may be different from those used by the encoder in the encoding process. The bitstreams may also include information pertaining to quantization levels for the non-zero coefficients. The information is used by a standard and compliant decoder to reproduce a set of non-zero coefficients at desired quantization values.

THE FIGURES

Various embodiments and exemplifications of our invention are illustrated in the Figures appended hereto.

DETAILED DESCRIPTION OF INVENTION

The invention is directed to a system and method of quantizing discrete cosine transform coefficients for image and video compression using a novel rescaling method in the encoding process. The novel encoding process receives a video signal for encoding and defines a plurality of thresholds for the quantization of each DCT coefficient. If any coefficient falls below its corresponding threshold, the corresponding coefficient is quantized to zero. The thresholds may be set according to a standard rate control algorithm that determines the quantization step sizes for DCT coefficients based on input signal, target bitrate and video encoding buffer fullness information. Based on the input, application and the constellation of the coefficients not quantized to zero ("non-zero coefficients"), the encoder determines a set of desirable reconstructed values for each of the non-zero coefficients. Based on encoding rate, distortion and other considerations, the encoder produces standard compliant bitstreams that contain information pertaining to a quantization step size for the block. Unlike conventional processes, these step sizes may be different from that used by the encoder in the encoding process.

For example, conventional encoders set step sizes after trying or testing them in the encoding process. The step sizes are then transmitted to a decoder and used to decode the signal in much the same but reverse manner as the manner in which the signal was encoded. The reconstructed values for all coefficients using this conventional approach are normatively defined for all standard compliant decoders. For example, with a quantization step size of 10, all coefficients quantized to a level of 1 by the encoder will be reconstructed as 10 by all standard decoder. There is no way to reconstruct one coefficient to 10, but another to 11.

In contrast, step sizes encoded into the signal according to the invention process may not have been tried or tested in the encoding process, but rather may be entirely different.

The bitstreams generated according to the present invention may also include information pertaining to quantization levels for the non-zero coefficient. The step size information and the quantization level information can then be used by a standard and compliant decoder to reproduce a set of non-zero coefficients at desired quantization values. The invention is described in this specification in the context of a system and method of quantizing discrete cosine transform coefficients for video compression using a novel rescaling method in the encoding process. It will be understood and appreciated by those skilled in the art that the embodiments described herein illustrate but a few enabling uses of the invention, and that the spirit and scope of the invention reaches further, such as to image and audio coding, and that the scope is defined by the appended claims and their equivalents.

Generally, in operation, a system configured according to the invention first defines a variety of thresholds for the quantization of transform coefficients below which the corresponding coefficient will be quantized to zero. In contrast to conventional methods, this is accomplished without an explicitly defined quantization matrix. The process then sets desired reconstructed values for coefficients that have not been quantized to zero and intelligently composes the corresponding bitstream. This is done in a manner that allows a standard compliant decoder to reconstruct non-zero coefficients to values that are close to the desired values, without the use of an explicit quantization matrix that designates the desired reconstruction values for each of the transform coefficients, possibly on a block-by-block basis. This cannot be accomplished by conventional methods of adjusting deadzone parameters or offsets for rounding. The method obviates the use of a burdensome matrix by selectively zeroing out coefficients using different deadzones for different coefficients, then generating rescaling data that defines modified step sizes to be used in the decoding process at the receiving end of the signal transmission.

The invention provides a method to achieve different reconstruction levels for the same quantized level for different transform coefficients for the same or different blocks without the use of a conventional quantization matrix. In light of the invention, those skilled in the art would understand that a system could set the reconstruction level for any coefficient in any block. Any standard compliant decoder could then decode the signal to an improved quality. According to the invention, any receiving decoder is not required to be programmed to detect that the encoder performed the novel process. After the encoder completes the process and transmits the processed signal, the receiving decoder is only required to follow a standard inverse quantizer procedure. Whether the bitrate increase is justified by the setting of the reconstruction level is determined by the specific application.

The invention provides a means for setting the reconstruction levels to a desired value for a particular application. In some applications, a quality metric that is different than the standard signal-to-noise ratio is desired. As a result, the desired reconstruction level is highly application dependent. However, as long as there are quality criteria, or if the application can determine the desired reconstruction levels by itself, the novel method can help a receiving device get as close to the desired value as possible according to application the criteria. The invention is not directed to setting these desired values, but rather how to get as close to these values as possible via a standard decoding process.

In general, the invention provides a method by which a block of DCT coefficients is first quantized with a larger quantization step size. Reconstruction levels of those coefficients that have not been quantized to zero in this first step are then precisely controlled by representing desired reconstructed values for these non-zero quantized coefficients as multiples of a different quantization step. The step size may be smaller, and intelligently selected according to the novel method. Therefore, without explicitly supporting a quantization matrix in the standard decoder, differentiated reconstruction levels for transform coefficients of different frequencies with the same quantized level can be accommodated. In one embodiment, the quantization step size is set according to the greatest common denominator (GCD) of the desired reconstruction levels. The reconstruction levels may or may not be integers themselves.

In conventional methods, the different coefficients would have been quantized to the same level and reconstructed to the same value using the original quantization parameter and a conventional quantization process. Conventional systems do not have multiple thresholds. If they exist, they are fixed and preset. For example, for 64 DCT coefficients, 0-63 are set, where, for example, 0-7 are one value, 8-24 are a second value, etc. It is possible in some circumstances to adjust the quantization matrices, and therefore the thresholds. This process, however, is very expensive in terms of hardware and data transmission bandwidth, or bitrate overhead. Some algorithms may even try quantization with different matrices before deciding on which one to use and to write to the bitstream.

Most applications, however, does not allow for any adjustment of the quantization matrix dynamically while still complying to standards (compliant to H.264 for example). The invention provides a system configured to dynamically adjust the reconstruction levels for each coefficient transmitting a by indicating via data in the bit stream that a quantization step size is different from that used in the encoder. Again, conventional means of processing multiple quantization tests and trials will signal a quantization step size that has been actually tried for quantization at the encoder. In contrast, as discussed above, a system configured according to the invention may send to the decoder something that is different from what was used by the encoder so as to precisely control the inverse quantization process of the decoder using standard inverse quantization. This technique will be known as quantization rescaling.

Figure 4:
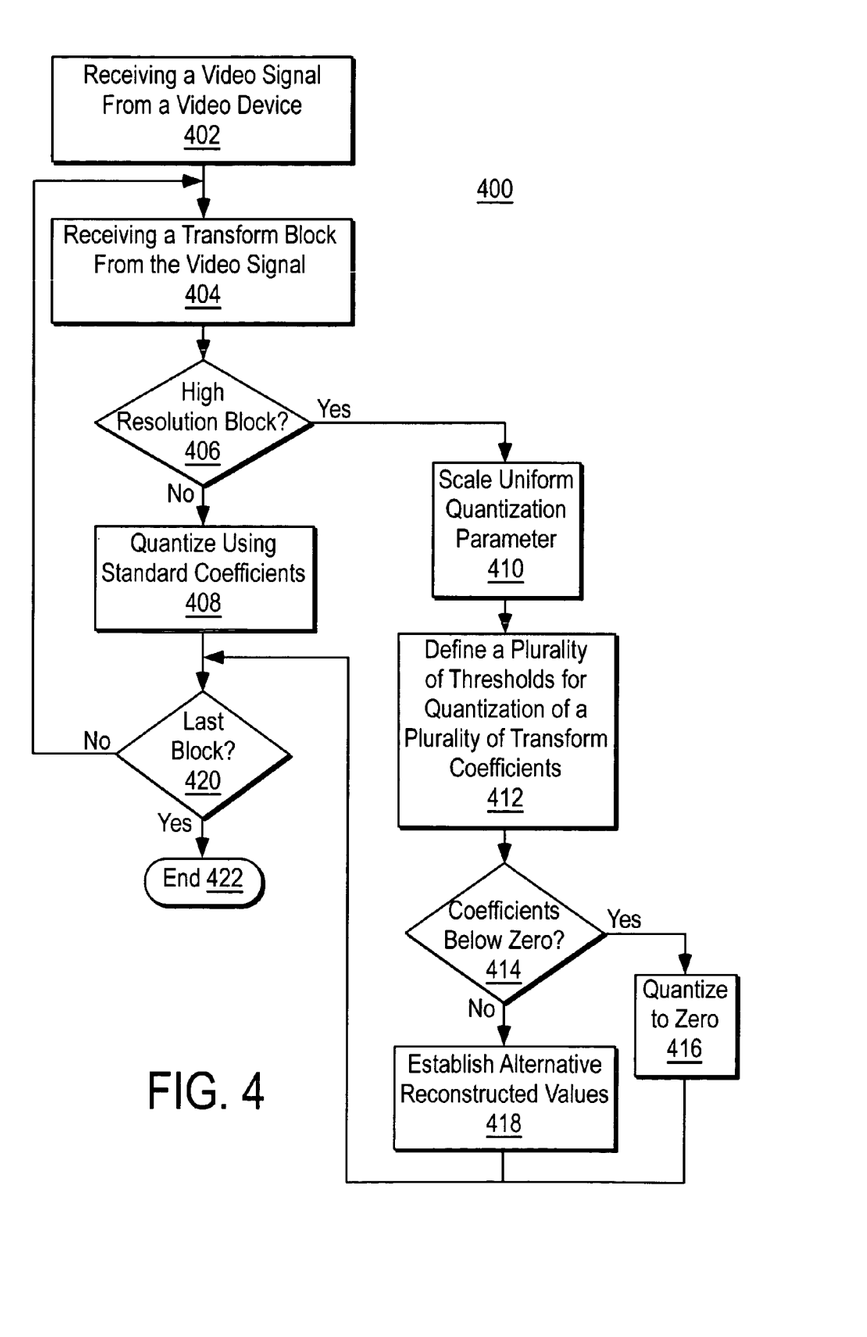
FIG. 4 is a flow chart illustrating a method configured according to the invention.

Referring to FIG. 4, a flow chart is provided illustrating one embodiment of the invention. In operation, referring to FIG. 4, the invention provides a novel method 400 of rescaling that produces an improved encoding of a video signal for a higher quality picture after decoding at a destination. The method begins at step 402, where a video signal is received from a video device. A single transform block is received from a transform block from the video signal in step 404. For each block, it is determined whether it is a high resolution block in step 406. If no, then the block is quantized according to standard coefficients in step 408. If the block is a high resolution block, then the process scales a uniform quantization parameter in step 410. Then, a plurality of thresholds for quantization of a plurality of transform coefficients are established in step 412. In step 414, it is determined which, if any, of the coefficients are below that which is established as the zero threshold. If any coefficients fall below the zero threshold, it is quantized to zero in step 416. If it does not fall below the zero level, then alternative reconstructed values are established in step 418. Then, after the block is quantized, whether the block is high resolution or not, then process determines whether the block is the last one in the video signal in step 420. If it is not, then the process returns to step 404 to retrieve another transform block from the video signal. If not, the process ends at step 422.

It will be apparent to those skilled in the art that the above described scheme does not achieve higher compression ratios at identical visual quality or better visual quality at identical compression ratio in all circumstances. To understand how the method improves transmission performance, the overall rate-distortion trade-off must be considered. The bit rate for representing the new quantization parameter and the larger quantization values must be considered using the new quantization parameter, rescaling.

As an illustrative example, consider standard H.264, wherein block transform coefficients are entropy encoded as a concatenation of VLC codewords from a number of possible tables. This is done as follows, with reference to code words from the H.264 standard. The first codeword of the representation, namely coeff_token, contains information about the total number of non zero coefficients after quantization, as well as the number of consecutive coefficients at the end of the block (after zig-zag scan) that are of magnitude 1, regardless of the sign. These coefficients are termed "trailing ones" ("T1s"). The codeword for coeff_token may come from 1 of 4 tables, depending on the number of non-zero coefficients of the block to the left and above the current block to be coded.

The codeword for coeff_token is followed by the signs of the trailing ones, each represented by one bit. Then, the remaining non-zero coefficients are encoded in reversed zif-zag order, followed by TotalZeros, which represents the sum of number of zeros preceding last non-zero coefficient after zig-zag scan. TotalZeros is followed by a string of run_before codewords, representing the number of zeros before each non-zero coefficient in reverse zig-zag order, except for the last. For most video sequences, most non-zero coefficients will be small. As a result, codetables in the H.264 standard are designed such that smaller levels will have shorter codewords. As for codewords for the coeff_token, codewords are shorter when the number of TrailingOnes is closer to the total number of non-zero coefficients. Therefore, assuming the same reduction in distortion, the most expensive and complicated cases for quantization rescaling is the when total number of non-coefficients equals to the number of trailing ones, and when the frequencies of the non-zero coefficients are low.

Table 1 is a conventional standard table from the H.264 Standard. As another example, consider the special case when the quantization step size equals to 10 (corresponding to an H.264 quantization parameter (QP) of 24, c.f. Table 1). Assume that there are two non-zero coefficients in a 4×4 block, both of which would be quantized to 1 using the conventional standard H.264 quantization. Table 2 contains recommended new QPs and levels to achieve various pairs of desired reconstruction levels. Assume in addition that the desired reconstructed levels for these two coefficients are as listed in the 3$^{rd}$ column of Table 2, then by using the new quantization parameter and corresponding quantization levels in column 4-6 of Table 2, a standard compliant decoder will achieve the reconstruction levels listed in column 5 and 6, using standard inverse-quantization procedure.

TABLE 1

Correspondence between Quantization Parameter and Quantization Step Size in H.264

| QP | 0 | 1 | 2 | 3 | 4 | 5 |
|---|---|---|---|---|---|---|
| Qstep | 0.625 | 0.6875 | 0.8125 | 0.875 | 1 | 1.125 |

| QP | 6 | 7 | 8 | 9 | 10 | 11 |
|---|---|---|---|---|---|---|
| Qstep | 1.25 | 1.375 | 1.625 | 1.75 | 2 | 2.25 |

| QP | 12 | 13 | 14 | 15 | 16 | 17 |
|---|---|---|---|---|---|---|
| Qstep | 2.5 | 2.75 | 3.25 | 3.5 | 4 | 4.5 |

| QP | 18 | 19 | 20 | 21 | 22 | 23 |
|---|---|---|---|---|---|---|
| Qstep | 5 | 5.5 | 6.5 | 7 | 8 | 9 |

| QP | 24 | 25 | 26 | 27 | 28 | 29 |
|---|---|---|---|---|---|---|
| Qstep | 10 | 11 | 13 | 14 | 16 | 18 |

| QP | 30 | 31 | 32 | 33 | 34 | 35 |
|---|---|---|---|---|---|---|
| Qstep | 20 | 22 | 26 | 28 | 32 | 36 |

| QP | 36 | 37 | 38 | 39 | 40 | 41 |
|---|---|---|---|---|---|---|
| Qstep | 40 | 44 | 52 | 56 | 64 | 72 |

| QP | 42 | 43 | 44 | 45 | 46 | 47 |
|---|---|---|---|---|---|---|
| Qstep | 80 | 88 | 104 | 112 | 124 | 144 |

| QP | 48 | 49 | 50 | 51 |
|---|---|---|---|---|
| Qstep | 160 | 176 | 208 | 224 |

TABLE 2

Recommended New QP and Corresponding Reconstruction Levels for Achieving Various Desired Reconstruction Levels According to the Invention

| Orig. QP/ Qstep | Orig. Level/ Desire Rec. Value #1 | Orig. Level/ Desire Rec. Value #2 | New QP/ QStep | New Level/ Rec. Value #1 | New Level/ Rec. Value #2 |
|---|---|---|---|---|---|
| 24/10 | 1/10 | 1/11 | 8/1.625 | 6/9.8 | 7/11.4 |
| 24/10 | 1/10 | 1/13 | 14/3.25 | 3/9.75 | 4/13 |
| 24/10 | 1/10 | 1/14 | 15/3.5 | 3/10.5 | 4/14 |
| 24/10 | 1/10 | 1/16 | 18/5 | 2/10 | 3/15 |
| 24/10 | 1/10 | 1/18 | 15/3.5 | 3/10.5 | 5/17.5 |

In establishing Table 2, it is taken into account that the probability density function of transform coefficients is usually (monotonically) decreasing with respect to the magnitude of the coefficient. As a result, the reconstruction value that minimizes the average quantization error over a quantization interval should be the centroid of the interval, which should be closer to the origin (i.e. smaller in absolute value) than the geometric mid-point of the line-segment of between the two ends of the quantization interval. Therefore, when a reconstruction value cannot be fount that exactly matches the desired value, it is picked as an approximation. In a preferred embodiment, the value is smaller than the desired value, as opposed to one that is larger.

Based on Table 2, the corresponding rate-distortion tradeoff can be calculated for the various choices. In H.264, an empirical formula was chosen for calculating rate-distortion costs based the QP used in encoding. For P frames, rate-distortion costs are calculated as $J=R+\Delta D$, where $\Delta = 0.85 \times 2^{\{(QP-12)/3\}}$.

As an example, consider the case when there are two none zero elements called x1 and x2 after DCT. In the quantization process QP=24 and Qstep=10. The range of x1 and $x2$ is $0.5 \leq \frac{x_1}{10} < 1.5$ and $0.5 \leq \frac{x_2}{10} < 1.5$.

Then after quantization

| X1 | 0 | 0 | 0 |
|---|---|---|---|
| 0 | x2 | 0 | 0 |
| 0 | 0 | 0 | 0 |
| 0 | 0 | 0 | 0 | becomes

| 1 | 1 | 0 | 0 |
|---|---|---|---|
| 0 | 0 | 0 | 0 |
| 0 | 0 | 0 | 0 |
| 0 | 0 | 0 | 0 |

The entropy encoding works as follows:

| Element | Value | Codeword |
|---|---|---|
| Coeff_token | TotalCoeffs = 2, T1s = 2 | 001 |
| T1 sign(2) | + | 0 |

-continued

| Element | Value | Codeword |
|---|---|---|
| T1 sign(1) | + | 0 |
| Level | None | |
| TotalZeros | 0 | 111 |
| run_before | None | |

The transmitted bitstream for this block is "00100111", or 8 bits.
Therefore $$J = D + \lambda * R = (x_1 - 10)^2 + (x_2 - 10)^2 + 0.85 * 2^{\frac{24-12}{3}} * 8$$

If it is assumed that x1 and x2 also satisfy $$5.5 \leq \frac{x_1}{1.625} < 6.5$$
$$6.5 \leq \frac{x_2}{1.625} < 7,$$

then with QP=8 and Qstep=1.625, the block will be rescaled to

| 6 | 7 | 0 | 0 |
|---|---|---|---|
| 0 | 0 | 0 | 0 |
| 0 | 0 | 0 | 0 |
| 0 | 0 | 0 | 0 |

And, the corresponding entropy coding is as follows:

| Element | Value | code |
|---|---|---|
| Coeff_token | TotalCoeffs = 2, T1s = 0 | 0000 0111 |
| T1 sign(2) | None | |
| Level(1) | +7(used level_vlc0) | 0000 0000 0000 1 |
| Level(0) | +6(used level_vlc1) | 0000 010 |
| TotalZeros | 0 | 111 |
| Run_before | None | |

The transmitted bitstream for this block is "0000 0111 0000 0000 0000 1000 0010 111", or a total of 31 bits. And $$J' = D' + \lambda' * R' = (x_1 - 6*1.625)^2 + (x_2 - 7*1.625)^2 + 0.85 * 2^{\frac{8-12}{3}} * 31$$

Therefore $$J - J' = (x_1 - 10)^2 + (x_2 - 10)^2 + 0.85 * 2^{\frac{24-12}{3}} * 8 -$$
$$\left\{(x_1 - 6*1.625)^2 + (x_2 - 7*1.625)^2 + 0.85 * 2^{\frac{8-12}{3}} * 31\right\} =$$
$$-0.5x_1 + 2.75x_2 + 73.88$$

To justify the manipulation in the rate-distortion sense, the parameters J−J′≧0 are assumed, which means the x1 and x2 must satisfy the following:

$$-0.5x_1 + 2.75x_2 + 73.88 \geq 0 \quad (1)$$

$$0.5 \leq \frac{x_1}{10} < 1.5 \quad (2)$$

$$0.5 \leq \frac{x_2}{10} < 1.5 \quad (3)$$

$$5.5 \leq \frac{x_1}{1.625} < 6.5 \quad (4)$$

$$6.5 \leq \frac{x_2}{1.625} < 7 \quad (5)$$

Solving the above equations yields the range in which the resealing of the QP improves the rate-distortion tradeoff to be 8.9375≦$x_1$<10.56 and 0.56≦$x_2$<11.375.

As another example, consider the case when there are three non-zero elements x1, x2 and x3 after quantization using the original QP of 24 corresponding to a Qstep=10.

Suppose $$1.5 \leq \frac{x_1}{10} < 2.5, -1.5 \leq \frac{x_2}{10} < -0.5, \text{ and } 0.5 \leq \frac{x_3}{10} < 1.5.$$

Then, after quantization:

| X1 | 0 | 0 | 0 |
|---|---|---|---|
| 0 | X2 | 0 | 0 |
| 0 | 0 | X3 | 0 |
| 0 | 0 | 0 | 0 |

Becomes:

| 2 | 0 | 0 | 0 |
|---|---|---|---|
| 0 | −1 | 0 | 0 |
| 0 | 0 | 1 | 0 |
| 0 | 0 | 0 | 0 | or 2 0 0 0 -1 0 0 0 0 0 1 0 0 0 0 after zig-zag scan.
The entropy coding works as follows:

| Element | Value | code |
|---|---|---|
| coeff_token | TotalCoeffs = 3, T1s = 2 | 0000 101 |
| T1 sign(2) | + | 0 |
| T1 sign(2) | − | 1 |
| Level(1) | +2 (used level_vlc0) | 001 |
| TotalZeros | 9 | 00011 |
| Run_before(1) | Zeroleft = 8 run_before 5 | 010 |
| Run_before(0) | Zeroleft = 3 run_before 3 | 00 |

The bitstream for this block is "0000 1010 1001 0010 0100 0", which has 21 bits.
Therefore $$J = D + \lambda * R = (x_1 - 20)^2 + (x_2 + 10)^2 + (x_3 - 10)^2 0.85 * 2^{\frac{24-12}{3}} * 21$$

Assuming adjusting the QP to 15 (QStep=3.4), and quantize the block to

| 6 | 0  | 0 | 0 |
|---|----|---|---|
| 0 | -4 | 0 | 0 |
| 0 | 0  | 3 | 0 |
| 0 | 0  | 0 | 0 |

The encoding process as follows:

| Element | Value | code |
|---|---|---|
| coeff_token | TotalCoeffs = 3, T1s = 2 | 0000 00111 |
| T1 sign | None | |
| Level(3) | +3(used level_vlc0) | 00001 |
| Level(2) | -4(used level_vlc1) | 00011 |
| Level(1) | 6(used level_vlc2) | 00110 |
| TotalZeros | 9 | 00011 |
| Run_before(1) | Zeroleft = 9 run_before 6- | 001 |
| Run_before(0) | Zeroleft = 3 run_before 3 | 00 |

The bitstream for this block will become "0000 0011 1000 0100 0110 0110 0001 1001 00", containing 30 bits. Therefore:

$$J' = D' + \lambda' * R' =$$
$$(x_1 - 6*3.36)^2 + (x_2 + 4*3.36)^2 + (x_3 - 3*3.36)^2 + 0.85 * 2^{\frac{15-12}{3}} * 30$$

And $$J - J' = (x_1 - 20)^2 + (x_2 + 10)^2 + (x_3 - 10)^2 + 0.85 * 2^{\frac{24-12}{3}} * 21 -$$
$$\left\{(x_1 - 6*3.36)^2 + (x_2 + 4*3.36)^2 + (x_3 - 3*3.36)^2 + 0.85 * 2^{\frac{15-12}{3}} * 30\right\} = 0.32x_1 - 6.88x_2 + 0.16x_3 + 268.33$$

J−J≧0 requires that $$0.32x_1 - 6.88x_2 + 0.16x_3 + 268.33 \geq 0 \quad (1)$$
$$1.5 \leq \frac{x_1}{10} < 2.5 \quad (2)$$
$$-1.5 \leq \frac{x_2}{10} < -0.5 \quad (3)$$
$$0.5 \leq \frac{x_3}{10} < 1.5 \quad (4)$$
$$5.5 \leq \frac{x_1}{3.36} < 6.5 \quad (5)$$
$$-4.5 \leq \frac{x_2}{3.36} < -3.5 \quad (6)$$
$$2.5 \leq \frac{x_3}{3.36} < 3.5 \quad (7)$$

Solving the above equations yields $18.48 \leq x_1 < 21.48$, $-15 \leq x_2 < -11.76$ and $8.4 \leq x_3 < 11.76$.

The above two examples are among the cases where the rescaling operation is the most "expensive" from a rate-distortion tradeoff perspective. Those skilled in the art will understand that these examples are only meant to be illustrative of the usefulness and the fundamentals of the invention.

Since the above is intended as an example, for clarity, in the above analysis, the number of bits required to signal the change of QP as a result of the QP rescaling was not included in the rate calculation. The reason for this omission is that when the proposed technique is used in an encoder, it is usually very likely that rescaling is carried out for consecutive MBs, therefore significantly reducing the QP change from MB to MB. However, depending on the application, this assumption may need to be modified.

We also did not consider, in the bitrate calculation, bitrate associated with information such as motion vectors and video coding modes. Such information does not change after the rescale operation, and, since A is a monotonically increasing function of QP, the contribution of such information to the overall rate-distortion cost J would actually decrease after rescaling, further justify the rescaling operation had been considered.

The above analysis used square error distortion as a measure for quality improvement, some application may treat visual quality as their primary target. This may be reflected in the selection of desired reconstruction values.

The analysis also directly compared rate-distortion cost calculated based on dramatically different QPs, and used in the cost calculation, a lambda that is a function of the QP. Even though this may not be entirely justifiable from a rate-distortion theory perspective, it is consistent with the widely accepted practice in H.264 CODECs when MB based rate control is performed. In addition, especially for applications where lambda is constant across MBs, the present invention could be used with the direction of the QP rescale reversed, i.e. the encoder may start with a global, small quantization step size, and then, based on rate-distortion considerations, perform optimized quantization, thereby zeroing out small non-zero coefficients that contribute little to distortion reduction but are expensive to encode bit rate wise. Finally, the encoder may, through a process similar to what we described above, select a quantization step size that is larger than the original, thereby reducing the magnitude of the remaining non-zero coefficients, and the bitrate needed to represent these values.

Figure 5:
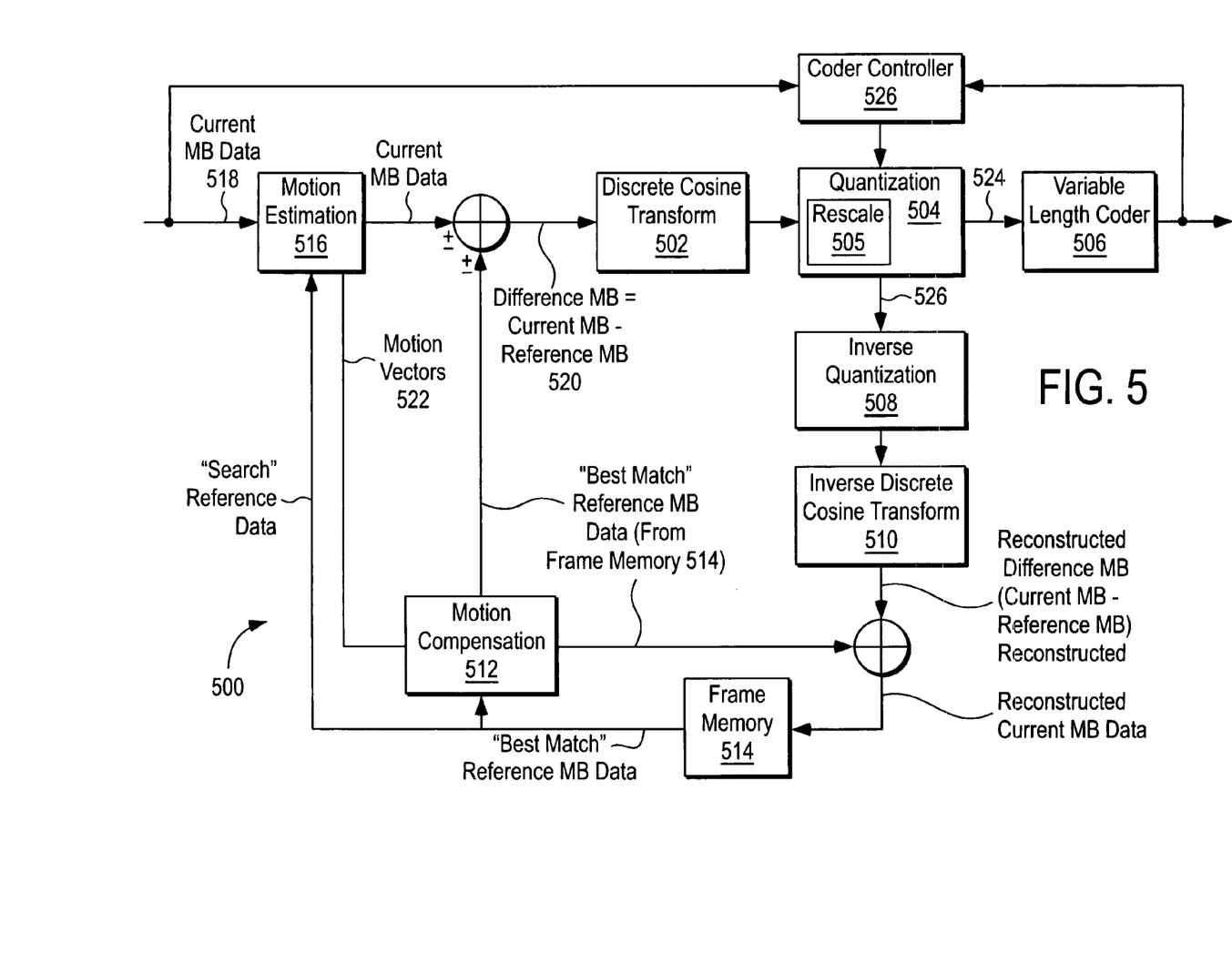
FIG. 5 shows a flow diagram of a generalized MPEG2 compliant encoder including a discrete cosine transformer, a quantizer, a variable length coder, an inverse quantizer, an inverse discrete cosine transformer, motion compensation, frame memory, and motion estimation. The data paths include the $i^{th}$ picture input, difference data, motion vectors the picture output, the feedback picture for motion estimation and compensation, and the motion compensated picture.

The method, system, and program product may be implemented in an MPEG encoder. FIG. 5 shows an architectural flow diagram of a generalized MPEG2 compliant encoder 500, including a discrete cosine transformer 502, a quantizer, 504 a rescaler 505 a variable length coder 506, an inverse quantizer 508, an inverse discrete cosine transformer 510, motion compensation 512, frame memory 514, and motion estimation 516. The data paths include the $i^{th}$ picture input 518, difference data 520, motion vectors 522 the picture output 524, and the feedback picture for motion estimation and compensation 526. The Coder Controller 528 provides frame administration processes, and takes inputs from both the input signal and the output signal. This Figure has the assumptions that the $i^{th}$ pictures exists in Frame Memory or Frame Store 514, and that the $i+1^{th}$ picture is being encoded with motion estimation.

The chart of FIG. 5 is provided for functional illustration of MPEG compliant encoding is shown in FIG. 5. In the flow chart, the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 5 the motion vectors, once generated, are used for the translation of the macroblocks of pixels, from the i.sup.th picture to the $i+1^{th}$ picture.

As shown in FIG. 5, in the encoding process, the images of the $i^{th}$ picture and the $i+1^{th}$ picture are processed in the encoder 500 to generate motion vectors which are the form in which, for example, the i+1$^{th}$ and subsequent pictures are encoded and transmitted. An input image 518 of a subsequent picture goes to the Motion Estimation unit 516 of the encoder. Motion vectors 522 are formed as the output of the Motion Estimation unit 516. These vectors are used by the Motion Compensation Unit 512 to retrieve macroblock data from previous and/or future pictures, referred to as "reference" data, for output by this unit. One output of the Motion Compensation Unit 512 is negatively summed with the output from the Motion Estimation unit 516 and goes to the input of the Discrete Cosine Transformer 502. The output of the Discrete Cosine Transformer 502 is quantized in a Quantizer 504. The output of the Quantizer 504 is split into two outputs, 524 and 526. One output 524 goes to a downstream element 506 for further compression and processing before transmission, such as to a run length encoder. The other output 526 goes through reconstruction of the encoded macroblock of pixels for storage in Frame Memory 514. In the encoder shown for purposes of illustration, this second output 526 goes through an inverse quantization 508 and an inverse discrete cosine transform 510 to return a lossy version of the difference macroblock. This data is summed with the output of the Motion Compensation unit 512 and returns a lossy version of the original picture to the Frame Memory 514.

The invention may be implemented, for example, by having the quantizer 504 as a software application (as an operating system element), a dedicated processor, or a dedicated processor with dedicated code. The quantizer 504 executes a sequence of machine-readable instructions, which can also be referred to as code. These instructions may reside in various types of signal-bearing media. In this respect, the invention provides a program product comprising a signal-bearing medium or signal-bearing media tangibly embodying a program of machine-readable instructions executable by a digital processing apparatus to perform a method for quantizing DCT coefficients.

According to the invention, the quantizer includes rescaler 505 that is configured to rescale the video signal. The novel rescaling method provides a means to transmit a video signal at low loss and reduced data, while providing a signal that can be decoded at a high clarity. The rescaler 505 operates with a method of quantizing discrete cosine transform coefficients by defining a plurality of thresholds for the quantization of the transform coefficients. The quantizer quantizes the coefficients that correspond to transforms that occur below the thresholds to zero, thus reducing the data to be output from the encoder and transmitted to the decoder. The quantizer then establishes alternative reconstructed values for coefficients other than those quantized to zero. The rescaler does this by selecting a uniform quantization step size for the entire block of coefficients. Alternative reconstructed values are established that are either multiples of the uniform quantization step size determined, and may be close to multiples of the uniform quantization step size.

The signal-bearing medium may comprise, for example, memory in server. The memory in the server may be non-volatile storage, a data disc, or even memory on a vendor server for downloading to a processor or a quantizer for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++". Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

The invention has been described in the context of a system and method for optimized quantization for video coding via quantization re-scaling. The system and method accomplish optimal quantization of transform coefficients with minimal bit rate overhead without using a quantization matrix by scaling a uniform quantization parameter for the entire transform block. It will be appreciated by those skilled in the art that the invention has a spirit and scope beyond that described herein, and the scope is better defined by the appended claims.

The invention claimed is:

1. A method of quantizing a plurality of transform coefficients for an encoding process, comprising:
  (A) receiving the plurality of transform coefficients corresponding to a high-resolution macroblock;
  (B) generating a plurality of first quantized coefficients in a circuit by quantizing said plurality of transform coefficients corresponding to said high-resolution macroblock using at least one first quantization step size;
  (C) defining a zero threshold for the plurality of first quantized coefficients, wherein a first subset of the plurality of first quantized coefficients are above the zero threshold, and a second subset of the plurality of first quantized coefficients are below the zero threshold; and
  generating a plurality of second quantized coefficients corresponding to said high-resolution macroblock by
    (a) establishing a plurality of reconstructed transform coefficients using a second quantization step size to approximately match a subset of the plurality of transform coefficients that correspond to the first subset of the plurality of first quantized coefficients,
    (b) rescaling the first subset of said plurality of first quantized coefficients to the first subset of the plurality of second quantized coefficients based on the plurality of reconstructed transform coefficients and the second quantization step size, and
    (c) setting to zero a second subset of said plurality of second quantized coefficients that correspond to the second subset of said plurality of first quantized coefficients,
    wherein (i) each of the plurality of alternative reconstructed transform coefficients is equal to the product of the second quantization step size and one of the first subset of said plurality of second quantized coefficients and (ii) said first quantization step size is different than said second quantization step size for said encoding process.

2. The method of quantizing a plurality of transform coefficients according to claim 1, further comprising a step of composing a bitstream carrying said plurality of second quantized coefficients and an indication of said second quantization step size such that said bit stream can be decoded by a standard decoder using said second quantization step size.

3. The method according to claim 1, wherein said at least one first quantization step size comprises a plurality of predetermined quantization step sizes that form a standard quantization matrix not available in said standard decoder.

4. The method according to claim 1, wherein said at least one first quantization step size comprises a plurality of predetermined quantization step sizes that form a non-standard quantization matrix that is not transmitted in a bitstream.

5. The method according to claim 1, further comprising the step of:
selecting said second quantization step size such that said rescaling improves a rate distortion cost.

6. The method according to claim 2, wherein said bitstream is established in a manner to allow said standard decoder to use an original and unmodified inverse quantization procedure to inverse quantize said second quantized coefficients using only said second quantization step size.

7. The method according to claim 1, wherein said second quantization step size is less than said first quantization step size.

8. The method according to claim 1, wherein said second quantization step size is greater than said first quantization step size.

9. The method according to claim 1, wherein said second quantization step size is approximately a greatest denominator of said first quantized coefficients.

10. The method according to claim 1, further comprising the step of:
rescaling a plurality of third quantized coefficients of a second block using said second quantization step size.

11. An apparatus comprising:
a first circuit for quantizing a plurality of transform coefficients for an encoding process, configured to (i) receive the plurality of transform coefficients corresponding to a high-resolution macroblock; (ii) generate a plurality of first quantized coefficients in a circuit by quantizing said plurality of transform coefficients corresponding to said high-resolution macroblock using at least one first quantization step size; (iii) define a zero threshold for the plurality of first quantized coefficients, wherein a first subset of the plurality of first quantized coefficients are above the zero threshold, and a second subset of the plurality of first quantized coefficients are below the zero threshold; and (iv) generate a plurality of second quantized coefficients corresponding to said high-resolution macroblock by
  (a) establishing a plurality of reconstructed transform coefficients using a second quantization step size to approximately match a subset of the plurality of transform coefficients that correspond to the first subset of the plurality of first quantized coefficients,
  (b) rescaling the first subset of said plurality of first quantized coefficients to the first subset of the plurality of second quantized coefficients based on the plurality of reconstructed transform coefficients and the second quantization step size, and
  (c) setting to zero a second subset of said plurality of second quantized coefficients that correspond to the second subset of said plurality of first quantized coefficients,
  wherein (1) each of the plurality of alternative reconstructed transform coefficients is equal to the product of the second quantization step size and one of the first subset of said plurality of second quantized coefficients and (2) said first quantization step size is different than said second quantization step size for said encoding process; and
a second circuit configured to compose a bitstream carrying said second quantized coefficients and an indication of said second quantization step size such that said bitstream can be decoded by a standard decoder using second quantization step size.

12. The apparatus according to claim 11, wherein selection of said second quantization step size and said composition of said bitstream are done on the fly.

13. The apparatus according to claim 11, wherein said at least one first quantization step size comprises a plurality of predetermined quantization step sizes that form a standard quantization matrix not available in said standard decoder.

14. The apparatus according to claim 11, wherein said at least one first quantization step size comprises a plurality of predetermined quantization step sizes that form a non-standard quantization matrix that is not transmitted in said bitstream.

15. The apparatus according to claim 11, wherein said first circuit is further configured to select said second quantization step size such that said rescaling improves a rate distortion cost.

16. The apparatus according to claim 11, wherein said bitstream is established in a manner to allow said standard decoder to use an original and unmodified inverse quantization procedure to inverse quantize said second quantized coefficients using only said second quantization step size.

17. The apparatus according to claim 11, wherein said second quantization step size is less than said first quantization step size.

18. The apparatus according to claim 11, wherein said second quantization step size is greater than said first quantization step size.

19. The apparatus according to claim 11, wherein said second quantization step size is approximately a greatest common denominator of said first quantized coefficients.

20. An apparatus comprising:
means for quantizing a plurality of transform coefficients for an encoding process, configured to (i) receive the plurality of transform coefficients corresponding to a high-resolution macroblock; (ii) generate a plurality of first quantized coefficients in a circuit by quantizing said plurality of transform coefficients corresponding to said high-resolution macroblock using at least one first quantization step size; (iii) define a zero threshold for the plurality of first quantized coefficients, wherein a first subset of the plurality of first quantized coefficients are above the zero threshold, and a second subset of the plurality of first quantized coefficients are below the zero threshold; and (iv) generate a plurality of second quantized coefficients corresponding to said high-resolution macroblock by
  (a) establishing a plurality of reconstructed transform coefficients using a second quantization step size to approximately match a subset of the plurality of transform coefficients that correspond to the first subset of the plurality of first quantized coefficients,
  (b) rescaling the first subset of said plurality of first quantized coefficients to the first subset of the plurality of second quantized coefficients based on the plurality of reconstructed transform coefficients and the second quantization step size, and
  (c) setting to zero a second subset of said plurality of second quantized coefficients that correspond to the second subset of said plurality of first quantized coefficients, wherein (1) each of the plurality of alternative reconstructed transform coefficients is equal to the product of the second quantization step size and one of the first subset of said plurality of second quantized coefficients and (2) said first quantization step size is different than said second quantization step size for said encoding process means for coding configured to compose a bitstream carrying said second quantized coefficients and an indication of said second quantization step size such that said bitstream can be decoded by a standard decoder using said second quantization step size.

21. The method according to claim 2, wherein selection of said second quantization step size and said composition of said bitstream are done on the fly.

* * * * *